W. T. Watson,
Tobacco Press.
N° 60,298. Patented Dec. 4, 1866.
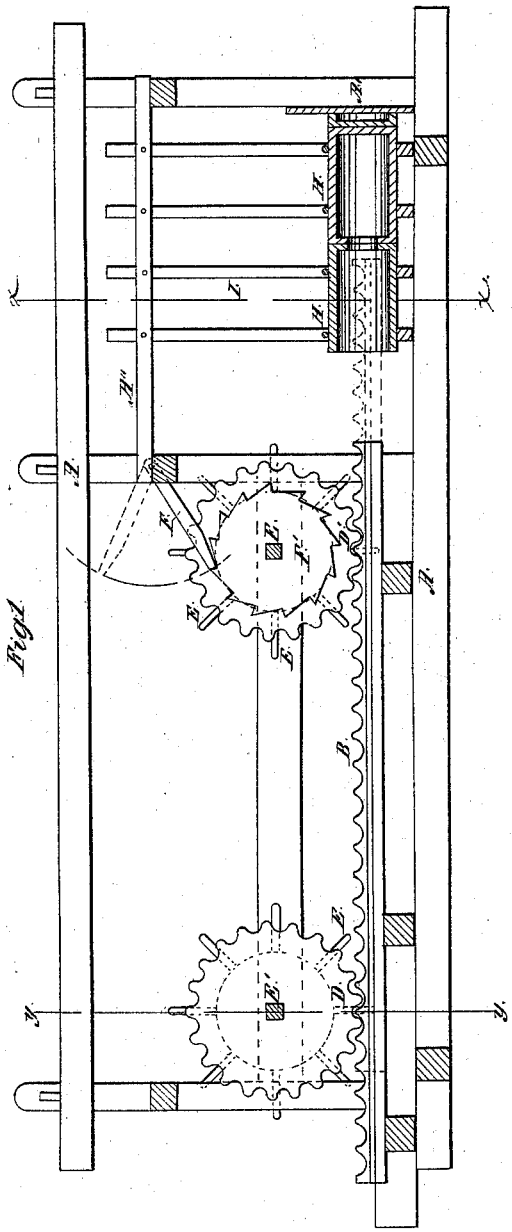
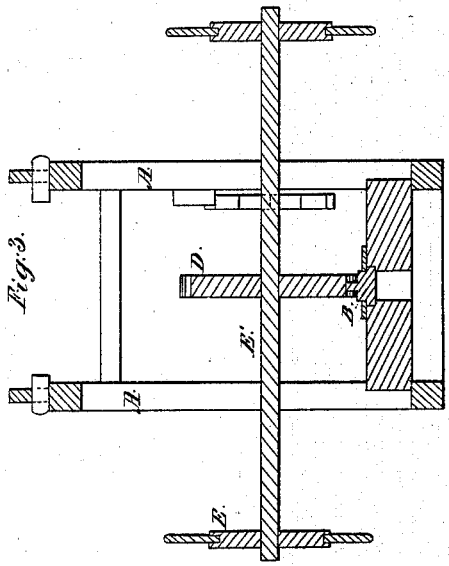
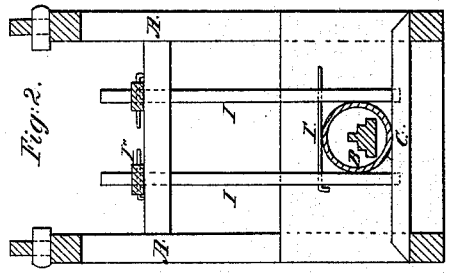
Witnesses:
Inventor:

United States Patent Office.

IMPROVEMENT IN TOBACCO PRESSES.

WILLIAM T. WATSON, OF NOTTINGHAM, MARYLAND.

Letters Patent No. 60,298, dated December 4, 1866.

SPECIFICATION.

TO ALL WHOM IT MAY CONCERN:

Be it known that I, WILLIAM T. WATSON, of Nottingham, in the county of Prince George's, and State of Maryland, have invented a new and useful Improvement in Tobacco Presses; and I do hereby declare that the following is a full, clear, and exact description of the same, reference being had to the annexed drawings, making part of this specification, in which—

Figure 1 is a vertical longitudinal section.
Figure 2 is a vertical transverse section on the line $x\ x$, fig. 1.
Figure 3 is a similar section on the line $y\ y$.

The same letters are employed throughout in the indication of identical parts.

My improvement is in the parts for holding the casks in position while receiving the action of the press.

A is the main frame of the press on ways, in the bottom of which slides the reciprocating-rack B, actuated by the pinions D D'. The pinions are placed on the transverse shafts E', which extend beyond their bearings on the main frame, and have on each end the wheels E, by which they are turned. On the shaft of one of the pinions (shown on the shaft of D') I place a ratchet-wheel, F', with a ratchet F hinged to the main frame working on its face. The keg, H, is placed on the frame at G, and is secured in proper position to receive the action of the press by the bars I, the toes of which are held in mortices in the sills G, while they pass through mortices in the beams A'', sliding easily up and down therein; when down they are secured by pins I''. The keg being in place, and the bars I properly adjusted and secured, rods I' are passed through the bars I immediately above the kegs. These bars I and rods I', in conjunction with the sills G, confine the keg on all sides, while the follower is pressed by the reciprocating-rack, actuated as desibed, against the tobacco. The circular projection A', which is of the size of the head within the chimes of the keg, sustains the pressure and prevents the head being forced out.

What I claim as my invention, and desire to secure by Letters Patent, is—

1. The combination of the sills G, sliding-bars I, and rods I' for confining the keg in a tobacco press, substantially as described.

2. In combination with above parts and the main frame A I claim the rack B, pinnions D and D', shafts E' and wheels E, together with the ratchet and wheel F F', arranged to operate substantially as set forth.

In testimony whereof I have signed my name to this specification in the presence of two subscribing witnesses.

WILLIAM T. WATSON.

Witnesses:
   WM. N. BURCH,
   JOHN R. RICHARDSON.